(12) United States Patent
Blok et al.

(10) Patent No.: US 11,254,108 B2
(45) Date of Patent: Feb. 22, 2022

(54) LAMINATE STRUCTURE FOR BIOCOMPATIBLE BARRIER PACKAGING

(71) Applicant: RENOLIT SE, Worms (DE)

(72) Inventors: Jakob Robert Blok, Zurich (CH); Hans Paul Henning Von Kirchbach, Alkmaar (NL); Petrus Johannes Antonius Karsten, Grootebroeten (NL)

(73) Assignee: RENOLIT SE, Worms (DE)

( * ) Notice: Subject to any disclaimer, the term of this patent is extended or adjusted under 35 U.S.C. 154(b) by 0 days.

(21) Appl. No.: 16/755,428

(22) PCT Filed: Oct. 4, 2018

(86) PCT No.: PCT/EP2018/077012
§ 371 (c)(1),
(2) Date: Apr. 10, 2020

(87) PCT Pub. No.: WO2019/081176
PCT Pub. Date: May 2, 2019

(65) Prior Publication Data
US 2020/0262186 A1 Aug. 20, 2020

(30) Foreign Application Priority Data
Oct. 24, 2017 (EP) .................................... 17198039

(51) Int. Cl.
*B32B 27/08* (2006.01)
*B32B 7/12* (2006.01)
(Continued)

(52) U.S. Cl.
CPC ............... *B32B 27/08* (2013.01); *B32B 7/12* (2013.01); *B32B 27/288* (2013.01);
(Continued)

(58) Field of Classification Search
CPC ......... B32B 27/08; B32B 7/12; B32B 27/288; B32B 27/306; B32B 27/32; B32B 27/34;
(Continued)

(56) References Cited

U.S. PATENT DOCUMENTS

| 4,407,873 A | 10/1983 | Christensen et al. |
| 4,640,852 A | 2/1987 | Ossian |

(Continued)

FOREIGN PATENT DOCUMENTS

| CL | 199800419 | 2/1998 |
| CL | 200301808 | 8/2004 |

(Continued)

OTHER PUBLICATIONS

"Hytrel® Thermoplastic Elastomer" DuPont, retrieved Mar. 17, 2021 (Year: 2021).*

(Continued)

*Primary Examiner* — Frank J Vineis
*Assistant Examiner* — Laura B Figg
(74) *Attorney, Agent, or Firm* — Paul D. Strain, Esq.; Strain & Strain PLLC

(57) ABSTRACT

Biocompatible flexible laminate structure comprising an alternating stack of layers from polymers A and B or polymer blends AC and BD having the sequence -A-[B-A-]$_n$- or AC-[BD-AC-]$_n$ with n from 4 to 36, wherein the layer thickness of layers A or AC and layers B or BD is less than 3 μm, wherein A and B are thermoplastic polymers and C and D are thermoplastic elastomers, at least part of the monomeric building blocks of polymer A, B or A and B are from renewable sources wherein the thermoplastic polymer B has functional barrier properties, wherein the amount of the thermoplastic elastomers C and D in the polymer blends AC and BD is each from 3 to 45 wt.-%, and polymer B and elastomer D are essentially incompatible.

23 Claims, 2 Drawing Sheets

(51) Int. Cl.
*B32B 27/28* (2006.01)
*B32B 27/30* (2006.01)
*B32B 27/32* (2006.01)
*B32B 27/34* (2006.01)
*B32B 27/36* (2006.01)

(52) U.S. Cl.
CPC ............ *B32B 27/306* (2013.01); *B32B 27/32* (2013.01); *B32B 27/34* (2013.01); *B32B 27/36* (2013.01); *B32B 27/365* (2013.01); *B32B 2250/04* (2013.01); *B32B 2250/05* (2013.01); *B32B 2250/24* (2013.01); *B32B 2250/42* (2013.01); *B32B 2270/00* (2013.01); *B32B 2307/54* (2013.01); *B32B 2307/558* (2013.01); *B32B 2307/581* (2013.01); *B32B 2307/7244* (2013.01); *B32B 2307/7246* (2013.01); *B32B 2439/46* (2013.01); *B32B 2439/70* (2013.01)

(58) Field of Classification Search
CPC ... B32B 27/36; B32B 27/365; B32B 2250/04; B32B 2250/05; B32B 2250/24; B32B 2250/42; B32B 2270/00; B32B 2307/54; B32B 2307/558; B32B 2307/581; B32B 2307/7244; B32B 2307/7246; B32B 2439/46; B32B 2439/70
See application file for complete search history.

(56) References Cited

U.S. PATENT DOCUMENTS

| | | | |
|---|---|---|---|
| 4,828,915 A | 5/1989 | Schroeder et al. | |
| 4,990,562 A | 2/1991 | Chou et al. | |
| 5,003,002 A | 3/1991 | Ofstein | |
| 5,076,776 A | 12/1991 | Yamada et al. | |
| 5,154,789 A | 10/1992 | Ossian | |
| 5,286,575 A | 2/1994 | Chou | |
| 6,413,595 B1 | 7/2002 | Schirmer | |
| 6,528,173 B1 | 3/2003 | Buzio et al. | |
| 6,964,816 B2 | 11/2005 | Schell | |
| 8,470,922 B2 | 6/2013 | Jacob | |
| 8,486,488 B2 | 7/2013 | Fayet et al. | |
| 2001/0008687 A1* | 7/2001 | Kollaja | C09J 7/29 428/220 |
| 2007/0202337 A1 | 8/2007 | Lischefski et al. | |
| 2011/0120902 A1* | 5/2011 | Boswell | B65D 65/38 206/524.6 |
| 2012/0315454 A1 | 12/2012 | Wang et al. | |
| 2013/0295355 A1 | 11/2013 | Lee et al. | |
| 2015/0144523 A1 | 5/2015 | Hirose | |
| 2016/0152075 A1 | 6/2016 | Shibata | |
| 2020/0189791 A1 | 6/2020 | Dregger et al. | |

FOREIGN PATENT DOCUMENTS

| | | |
|---|---|---|
| CL | 49538 | 10/2007 |
| CN | 1225883 A | 8/1999 |
| CN | 1378913 A | 11/2002 |
| CN | 1379713 A | 11/2002 |
| CN | 1508008 A | 6/2004 |
| CN | 1972801 A | 5/2007 |
| CN | 102449062 A | 5/2012 |
| CN | 104271453 A | 1/2015 |
| EP | 0 064 330 B1 | 3/1986 |
| EP | 1 314 758 A1 | 5/2003 |
| EP | 1 396 337 A1 | 3/2004 |
| EP | 1 825 997 A2 | 8/2007 |
| EP | 1 658 175 B1 | 10/2009 |
| EP | 1 629 543 B1 | 8/2013 |
| ER | 2 716 445 A1 | 4/2014 |
| JP | H10-272742 A | 10/1998 |
| JP | 2008-155438 A | 7/2008 |
| JP | 2008-208347 A | 9/2008 |
| JP | 2009-143003 A | 7/2009 |
| JP | 2012-250356 A | 12/2012 |
| JP | 2013-512201 A | 4/2013 |
| JP | 2014-508688 A | 4/2014 |
| JP | 2016-5878 A | 1/2016 |
| JP | 2017-105110 A | 6/2017 |
| WO | WO 98/36905 A1 | 8/1998 |
| WO | WO 01/096661 A1 | 12/2001 |
| WO | WO 02/056930 A2 | 7/2002 |
| WO | WO 2011/152015 A1 | 12/2011 |
| WO | WO 2014/001346 A1 | 1/2014 |
| WO | WO 2014/103587 A1 | 7/2014 |
| WO | WO 2017/115685 A1 | 7/2017 |
| WO | WO 2018/080869 A1 | 5/2018 |

OTHER PUBLICATIONS

International Search Report, PCT/EP2018/077012, dated Oct. 26, 2018, 2 pgs.
Ma et al., "Thickness effects in microlayer composites of polycarbonate and poly(styrene-acrylonitrile)", Journal of Materials Science, vol. 25 (1990), pp. 2039-2040.
Liesl K. Massey, "Permeability Properties of Plastics and Elastomers: a guide to packaging and barrier materials" 2nd Edition (2003), Plastics Design Library, ISBN 1-884207-97-9, 59 pgs.
Li Dongli, "Structure and Performance of Flexible Plastic Packaging Materials", China Light Industry Press (Mar. 31, 2015), CPCH2060587P, pp. 24-28.

* cited by examiner

LAMINATE STRUCTURE FOR BIOCOMPATIBLE BARRIER PACKAGING

CROSS-REFERENCE TO RELATED PATENT APPLICATIONS

This application is a National Stage of International Application No. PCT/EP2018/077012, filed Oct. 4, 2018, which is based upon and claims the benefit of priority from prior European Patent Application No. 17198039.4, filed Oct. 24, 2017, the entire contents of all of which are incorporated herein by reference in their entirety.

The present invention provides and generally relates to a tough, flexible and non-heat shrinkable barrier laminate structure having a plurality of alternating extruded polymeric layers from bio degradable polymers and/or at least partially renewable sources originating polymers. The plurality of layers are constructed in a way to provide superior gas, aroma and moisture barrier functions, flexibility, intrinsic transparency and toughness which are useful for medical, food and other packaging film applications.

It is well-known in the packaging industry to package food (e.g. meat, fish, cheese), liquid food products (such as milk or fruit juice) as well as medical and other products (such as medical devices; enteral, (total) parenteral, topical medication and fluids; living cells; personal care products such as fragrances, bandages, wipes) in packaging like containers, bags, trays, and bottles that are constructed from polymeric (i.e. plastic) material, often multi-layered film material.

There is great interest in the development of polymers and polymer structures which are made from renewable sources, often called bio-based, and which are environmental friendly (eco-friendly), e.g. not polluting land, sea or our atmosphere for decades. Using innovative processing technologies is an important strategy to reduce the dependence on fossil fuels and support the transition towards a greener and more sustainable future. There is also great interest to develop biodegradable polymers and polymer structures with tunable physical, mechanical and biochemical properties and biodegradable polymers attract great interest for both biomedical and ecological applications. The term renewable sources is herein used to designate a resource which replenishes to overcome depletion caused by usage and consumption either through biological or other naturally occurring processes in a finite amount of time in a human time scale. Specifically, renewable sources are raw materials which are derived exclusively from living organisms, preferably from microorganisms, plants, fungi, and animal products or excrements, as opposed to raw materials from fossil fuel like oil, gas and other sources that need very long times compared to human life span to form. With regard to energy sun, water and wind power as well as biogas are covered. Materials from renewable sources are also designated "bio-based" or "bio- . . . " herein. In the case of polymers at least one preferably more than one and most preferred all monomers are from renewable sources. The term biocompatible materials means either materials made at least partly, preferably essentially, and most preferred exclusively, from renewable sources or biodegradable materials or biodegradable materials made partly or exclusively from renewable sources. Biodegradable means that the material disintegrates into products not harmful for the environment within a time comparable to or shorter than a human lifespan when left in the environment.

For packaging there is also great interest in the development of polymers and polymer structures with a high barrier to oxygen, carbon dioxide, water (moisture), and organic vapors (aromas). Various proposals have been made to improve the barrier properties of polymeric substrates.

One common approach uses coating an inorganic layer on the top of a polymer substrate, as described e.g. in EP 1629543 B1 and U.S. Pat. No. 8,486,488 B2. The formation of defects in the coating, however, like pin holes or crazes, often leads to the formation of a diffusion pathway. This ruins the barrier properties over time. Another disadvantage is that the coating must be applied to a base structure in a secondary process.

The incorporation of solid inorganic fillers to improve gas barrier properties of polymers has also been widely used and is described e.g. in WO 2001/096661 A1. Incorporating such fillers in large amounts, however, complicates processing due to the inherent increase in melt viscosity. The incorporation also often leads to a loss of optical properties like gloss and transparency or creates inhomogeneity.

A further approach is the use of films from polymers with functional barrier properties. There are not many polymer types commercially available that have sufficient functional barrier properties against oxygen, nitrogen, carbon dioxide and organic vapors. Generally known amongst others are ethylene vinyl alcohol copolymer (EVOH), polyvinylidene chloride (PVDC), polyketone (POK), and polyamide (PA). A more special type is a film grade of polyvinyl alcohol (PVOH). Only certain grades of polyamides and PVOH are degradable or compostable in soil or (sea) water in less than a couple of years and are or can be made from renewable sources. For instance POK can be made from bio-ethylene and carbon monoxide. Further known are the group of polyalkylene carbonates like PEC (polyethylene carbonate), PPC (polypropylene carbonate), PBC (polybutylene carbonate), PCHC (polycyclohexene carbonate) made from alkyleneoxide and carbon dioxide ($CO_2$). Especially PEC exhibits good barrier properties against gases and aromas.

Films from these polymers are able to provide the desired barrier but almost always lack some other desired or needed property or are comparatively expensive. Other polymers providing films with barrier properties are polymers or copolymers made from e.g. ethylene, propylene, butylene, methylpentene, norbornene and the like with or without a minor ester or acrylate component like vinylacetate (EVA), methyl-acrylate (EMA). They have good barrier properties against water (moisture) but are lacking barrier properties against gases and aromas. An exception is polyisobutylene which has medium barrier properties against gases. To date also building blocks (e.g. monomers) for polymers can be generated from biomass, feedstocks are for instance, corn, soy, wheat, canola, sugar, flax, sunflower, grasses. After pretreatment of cellulose a.o. ethanol, butanol, acetone and hydrogen can be generated. After pretreatment of biomass hemicellulose and after chemical modification for instance levulinic acid, hydroxymethyl furfural and furfural can be generated. From biomass also lignin from which vanillin and vinylesters can be harvested. Out of fermentation of biomass citric, lactic, succinic, azelaic, itaconic, aspartic, glutamic, levulinic and many more carboxylic acids including dicarboxylic acids can be harvested. From lignocellosic sugar an important acid e.g. furandicarboxylic acid (2,5-FDCA) can be made. Also isosorbides, fatty acids, lysine and many others can be gained from natural renewable sources. From these intermediates all kinds of thermoplastics and elastomers like polyurethanes, polyamides, polyesters, glyco-polymers, polyester amides, poly(ester)carbonates and even polyolefins can be polymerized by processes (mostly catalytic) well known in the art.

In many cases improved barrier properties are created by using films with a plurality of layers, so called multi-layer films, to combine for instance water vapor barrier and gas barrier properties. Such films are described in many articles and patents, though not only for packaging use. In especially food packaging applications PA/EVOH/PA structures are widely used (see for instance U.S. Pat. Nos. 4,407,873 A; 4,640,852 A; EP 1314758 A1; EP 1658175 B1 or U.S. Pat. No. 5,154,789 A) to form the central core layers for barrier packaging. EVOH is a very good oxygen barrier material but it is brittle and has the tendency to crack (as also noticed in U.S. Pat. No. 4,828,915 A and EP 64330 B1) with the result that it loses part of its barrier function. It was found that to reduce this loss EVOH can be protected on both sides by a PA layer. To allow printing and sealing, skin or outer layers with good printability and/or sealability are usually added. The most basic structure in this respect is a seven layer film consisting of the barrier core PA/EVOH/PA, two skin layers of polyolefin (PO) or olefin copolymer (coPO) like polyethylene (PE), polypropylene (PP), or ethylene vinyl acetate copolymer (EVA), and two tie layers (often maleic anhydride grafted polyolefin or olefin copolymer, MAH-g-PO or MAH-g-coPO, e.g. MAH-g-EVA or MAH-g-EMA) to ensure adhesion of skin and core, resulting in a laminate structure (co)PO/tie/PA/EVOH/PA/tie/(co)PO. There are many grades of EVOH varying in ethylene content from about 23 to 50 mol-% and there are even more variants and grades of PA (e.g. PA6, PA6,6, PA4,6, PA 4,10, PA6,10, PA10,10, PA10,12, MXD6, PA11, PA12, PA6,12) from which PA11, PA 4,10, PA6,10, PA10,10 and PA10,12 are for instance (largely or partly) made from renewable sources (e.g. castor beans; rapeseed oil; succinic, adapic, azelaic and sebacic acid from fermentation processes; 1,4 butanediamide from bio-succinic acid for instance). Another group of bio-based polyamides are PA6F, PA8F, PA10 and PA12F, which are poly(hexa, octa, deca, and dodeca methylene furandicarboxilicamides). So there are many variations of such seven layer structures possible. Many patent applications have been filed for various applications including food packaging and sub-applications like shrinkable film used around bottles, or meat for instance, but also for packaging requiring odor barrier properties like film for ostomy bags and skin packaging for meat, fish, fish products, and meat products. Also blends of EVOH and PA in all kinds of variations are known (see for instance U.S. Pat. Nos. 4,990, 562 A, 5,003,002 A, and 5,286,575 A).

WO 02/056930 A2 relates to medical devices, especially catheters and balloons, which are said to have better stress resistance by making the walls from multilayer structures formed of alternating layers from soft and hard polymers. Barrier properties against water vapor, oxygen etc. are not discussed. EP 2 716 445 A1 describes multilayer structures useful as inner liners of tires. The structures rely on alternating barrier and elastomer layers, the elastomer blends mentioned shall have the elastomer as matrix phase.

To make films having good barrier properties against gases, aromas and water (moisture) either by lamination or co-extrusion a certain minimum thickness of the barrier layer is required. A good barrier for oxygen has a transmission rate of it of less than 10 cm$^3$/m$^2$·day·bar at 85% RH (relative humidity) at room temperature (RT; ~21° C.). Using for example a film structure with 32 mol-% ethylene in the EVOH, the EVOH layer should be about 15 μm thick to achieve good barrier property. EVOH and also PVOH however are rather stiff polymers at RT and below, at least those EVOH grades having less than 40 mol-% of ethylene in the structure of the copolymer. Its elongation at break at RT is rather low and it breaks brittle (like glass) under stress, flexing, impact and elongational forces.

It is also known that the flexibility of the EVOH can be increased by blending with all kinds of rubbers and elastomers, wherein compatibilizers are often additionally included, see e.g. U.S. Pat. No. 8,470,922 B2. The first such modification was the addition of rubber or elastomeric particles to glassy polystyrene to create high impact polystyrene (HIPS). A rubber is a crosslinkable elastomer, which after processing and curing (vulcanization) is not melt extrudable anymore. In contrast, thermoplastic elastomers (TPE) are melt extrudable polymers with properties like rubber at RT. They are not chemically permanently crosslinked, crosslinks are physical. However, transparency and homogeneity of the dispersed rubbery phase can be a problem. It is not considered in the mentioned patent since this is not relevant for the application described there.

Another point is that the rubbery and elastomeric phases only marginally contribute to the toughness of the impact modified polymer. Although not completely under-stood, it is believed that various parameters like rubber-phase and elastomer-phase volume fraction, their particle size, the degree of adhesion between the particles and the matrix, and the thickness of the modified polymer layers influence the achieved effects like formation of crazes, growth and breakdown around the rubbery or elastomeric particles. All these factors are usually considered in the choice of materials for a laminate structure. Toughness is determined by extrinsic variables such as sample dimensions, notch geometries, testing speed and temperature, and intrinsic parameters such as molecular structure and microstructure or morphology. One can make a tougher film by influencing the intrinsic parameters.

It is also known e.g. for multi-layer laminates from polycarbonate and poly(styrene-acrylonitrile) that properties like toughness and ductility improve when the number of layers increases, i.e. their thickness decreases, see e.g. first two pages of Ma et al., "Thickness effects in microlayer composites of polycarbonate an poly(styrene-acrylonitrile)", J. Mat. Science 25 (1990) pp. 2039-2040. The process of deformation only exists if the stress in the oriented film is below the breaking stress, while the stress in the not deformed connected matrix surpasses the yield stress. This principle can be generally applied to polymer systems. By lowering the layer thickness these conditions are approximated, resulting in a continuation of the process of deformation.

s Other factors that are considered in the selection of materials for a laminate structure include the cost and the recyclability, compostability and (bio)-degradability of the materials used as well as the total amount of materials necessary that determines the amount of waste produced.

In particular, it would be desirable to have higher performance, eco-friendly, lower cost multi-layer polymeric films. Higher performance includes providing multi-layer films with lower basis weights and better carbon footprint while providing the necessary barrier functions that compare with or exceed the properties of existing laminates. It is therefore an object of the invention to improve upon the known art.

We found surprisingly that it is possible to obtain more biocompatible laminate structures with increased barrier properties, flexibility, transparency and toughness without making a thicker overall polymer barrier layer by micro layering. Preferably but not necessarily the properties are further improved by introduction of a bio/renewable sourced elastomer as second phase. According to the invention polymers A and B and if present also elastomers C and D are at least partially from renewable sources, and preferably all are as far as possible bio-based. When manufacturing the structure by a one-step blown film extrusion process preferably the concepts water quenching and controlling blow-up ratio are also relied upon.

Accordingly, the present invention provides a laminate structure comprising an alternating stack of layers of different types of polymers A and B having the sequence -A-[B-A-]$_n$ with n from 4 to 36, a layer thickness of layers A and B of less than 3 μm, typically less than 1 μm, wherein A and B are thermoplastic polymers based at least partly on renewable sources and the thermoplastic polymer B has functional barrier properties against transmission of oxygen, nitrogen, carbon dioxide, organic vapors. Preferably, the polymers A and B are each blended with a thermoplastic elastomer C and D, especially preferred made at least partly from renewable polymer building blocks (e.g. monomers), forming polymer blends AC and BD, in which the amount of the thermoplastic elastomers C and D in the blends is each from 3 to 45 wt.-%, and the thermoplastic polymer B and elastomer D are essentially incompatible and wherein the alternating stack is composed of layers -AC-[BD-AC-]$_n$ with n from 4 to 36 and the layer thickness of layers AC and BD is less than 3 μm, typically less than 1 μm.

The micro layering of polymer layers or polymer blend layers to obtain a stack of alternating layers with a thickness below 3 μm in essence influences morphology and molecular structure of the polymers used. Thereby, they become more ductile and entangled. The first enhances flexibility and the second prevents delamination and/or rupture of the layers.

Introducing a second phase in the form of dispersed elastomeric polymeric particles C and D in a polymeric layers A and B, respectively, controls local deformation mechanisms, like crazing or cracking and consequently breaking of the layers especially in thin layers below 3 μm. Therein, AC denotes a blend of polymer A with elastomeric polymeric particles C and BD a blend of barrier polymer B with elastomeric polymeric particles D. The macroscopic toughening and intrinsic deformation behaviour is dependent on the rubber/elastomer content and microscopic morphology. Cavitation in the elastomer phase is essential for plastic deformation. The cavitation events lead to a redistribution of the stresses in the surrounding matrix and promote effective plastic deformation by a shear yielding process of the matrix. Before cavitation, the stresses on the surface of an elastomeric particle are determined by its bulk modulus and its volume strain. Once a void is formed, the volume strain within the elastomeric phase, and therefore also the normal stresses at the surface of the particles, drop approximately to zero, so that the particle effectively becomes a void. Consequently, the modulus of an elastomer determines its ability to cavitation. Elastomers with a decreased modulus and hence decreasing cavitation resistance are more effective as toughening agents, whereas severe crosslinking of the rubber phase prohibits the cavitation process.

In the preferred method of manufacturing the laminate structure, blown film extrusion is applied with water quenching and orientation of polymer chains by controlling blow-up ratio.

Water quenching of the film bubble influences crystal growth in semi crystalline polymers. By cooling the film quickly with water, so called water quenching, crystalline or semi crystalline polymers are more transparent and flexible due to smaller size crystals. The crystallization process can disturb an already organized microstructure, inhibit the organization of microstructures or induce a transition between two different morphologies. The final morphology after crystallization depends on whether the samples are cooled from a micro phase separated melt or crystallize from a homogeneous melt or solution. Furthermore, the presence of amorphous blocks affects the crystallization kinetics. In the case of glassy, amorphous and semi crystalline polymers, the basic approach is that the entanglement network is retained upon quenching in the glassy state. The characteristics of the entanglement network, like the molecular weight between entanglements, $M_e$, can be estimated in the melt from the apparent rubber plateau modulus. Applying the classical concept of rubber elasticity, the maximum draw ratio of a network DRmax scales with $M_e^{1/2}$. The toughness is mainly determined by the strain at break of stretching the entanglement network to its maximum elongation, following this simple analysis, one can easily derive that for instance polystyrene possesses a DRmax of approximately 310% and for instance polycarbonate 150% and EVOH up to 600% as for certain variants of polyamides. In practice most polymers do not reach their maximum DRmax level macroscopically due to uncontrolled crazing processes, impurities (like gels), and (in)organic additives.

Orientation by aligning the polymer chains is achieved through controlling the blow up ratio. The orientation is done in the molten stage, in order to minimize the shrinking and creeping during usage (i.e. memory effects) of the polymer films. Shrinking is not desired for films undergoing some kind of sterilization, pasteurization, retort, microwaving, or cooking process. Also severe creeping of film (change in dimension under stress over a period of time) is not desired.

Craze initiation and craze propagation are strongly influenced by the microstructure and the direction of the lamellar regions. If the lamellae are ordered perpendicular to the craze direction, i.e. parallel to the tensile direction, crazes are stopped at the borderline of stacked lamellae. In the microscopic regions, the so-called grains, the lamellar micro domains are preferentially oriented but the orientation direction differs from that in the neighbouring grains. The overall structure can be taken as an assembly of grains. Stacked lamellae oriented parallel to the applied stress field are more effective in craze stopping than a single lamella. Furthermore, the local orientation of the morphology in grains leads to craze diversion: crazes propagation does not occur perpendicular to the external stress field in all cases. In a toluene cast film, the grains with stacks of lamellae oriented to the direction of the stress are effective craze stoppers.

According to the invention it is possible to provide a multi-purpose packaging laminate structure showing superior mechanical and barrier properties at low overall thickness which is also eco-friendly. The laminate structure according to the invention is not only effective as to gas barrier properties but also as to aroma barrier and water vapor barrier properties and has improved mechanical properties like toughness, puncture resistance, impact strength, and tear initiation and propagation resistance. The laminate structure according to the invention is made from polymers which are at least partly, preferably mainly or completely, derived from renewable sources. In some embodiments the structure is also biodegradable The structure has a water vapor transmission rate (WVTR) of less than 5 g $H_2O$ per $m^2$ in 24 hours at 23° C. and 85% RH (DIN 53122). Further, the structure has an oxygen transmission rate (OTR) of less than 10 $cm^3$ $O_2$ per $m^2$ in 24 hours at 23° C. and at 50% RH (ASTM D 3985).

Typically the flexible and tough laminate structures are desired to have the following mechanical characteristics:

Flexibility expressed for instance as tensile modulus, measured according ISO 527-1,2,3/ASTM D882 (at 23° C. and 50% RH): <400 MPa, preferably <250 MPa, most preferred in the range from 75-150 MPa.

Tensile strength at break (or ultimate tensile strength) measured according ISO 527-1,2,3/ASTM D882: >10 MPa preferably >15 MPa but less than 40 MPa.

Elongation at break measured according ISO527-2,3/ASTM D882: >200% preferably >300% but less than 800%.

Impact strength can be measured according several methods:
- Izod ASTM D256 notched at 23° C. in J/m: preferably: no break
- Izod ISO 180 (1A) notched in $J/m^2$: preferably no break
- Charpy impact strength notched measured according ISO 179 in $KJ/m^2$: preferably no break.
- Tensile impact strength ISO 8256 A1 notched at 23° C.: preferably above 160 $KJ/m^2$.
- Dart impact strength ASTM D1709: preferably above 250 g.
- Spencer impact measured according ASTM D3420: preferably above 30 J/mm.

Elmendorf tear strength measured according ISO 6383-2/ASTM D1922 of at least about 2 N, preferably above 3 N.

Tensile Toughness can be determined by stress strain testing as described in ASTM D638 ASTM D882 and ISO 527 (e.g. the energy a sample can absorb before it breaks, which is the area under a stress-strain curve) should >15 $MJ/m^3$, preferably >25 $MJ/m^3$ and most preferred >40 $MJ/m^3$.

Puncture resistance (total penetration energy), testing made using a similar ASTM F1306-90 or DIN EN 14477, should be at least 15 J, preferably more than 25 J.

Thus, the laminate structure is among other suitable for use as a packaging material usable on horizontal and vertical flow-wrapper machines (HFFS & VFFS), on pouch making machines including stand-up pouch machines, on thermoforming machines as top or forming webs, skin packaging machines and on tray sealing equipment as lidding or skin packaging film. It is especially suitable for medical use, e.g. as ostomy film and for packaging of (liquid) (total) parenteral, enteral and topical medication (e.g. drugs, nutrition) and for making cell culture and storage (2D, 3D) bags and containers; and for use in food packaging applications like bag-in-box liners and lidding films. A further preferred use is the packaging of cosmetics and personal hygiene articles.

The barrier properties are provided by a stack of alternating microlayers from polymers A and B or polymer blends AC and BD, also designated barrier stack herein. In one embodiment polymer A is an at least partly bio-based polyamide (PA). The PA can be a nucleated type. Nucleation of the polyamide means adding an inorganic nucleating agent that forms a relatively large number of crystallisation starting points (nucleation sites) resulting in a polyamide with a relatively higher level of crystallinity whereby the actual spherulites are smaller than in the non-nucleated version. Such a nucleated polyamide gives a relatively high gas barrier in comparison with the non-nucleated version. Polymer A can also be a maleic anhydride grafted biopolyolefin (e.g. its monomeric building blocks made from renewable sources) (MAH-g-PO) or olefin copolymer (MAH-g-coPO) or a blend thereof with polyolefin or olefin copolymer. Polymer A can further be a diacid based biopolymer like polyalkylene succinate or a ionomer (ION). These copolymers can be grafted with an anhydride, e.g. PO-g-MAH, and grafted copolymers can be used as blends with the not grafted polyolefins and/or copolymers. Especially, MAH-g-(co)PO is usually used as blend of a so called concentrate of grafted (co)polyolefin with the not grafted (co)polyolefin of the same type. Polymer A can still further be a polyketone or a blend of PA and ethylene vinyl alcohol copolymer. Polymer B is preferably a polyalkylene carbonate (PAC, e.g. PEC, PPC, PBC, PCHC), poly(1,3 glycerol carbonate) eventually mixed with polytetramethylene succinate or a polyketone (POK) or a polyvinyl alcohol (PVOH) or ethylene vinyl alcohol copolymer (EVOH) made out of bio-ethylene and a modified bio-vinylester or a mixture or blend of EVOH or POK or PVOH or PAC with PA, wherein PA preferably is present in an amount less than 40 wt.-% and is at least partly from a renewable source.

The preferably used polymer blends AC and BD can also comprise mixtures or blends of two or more thermoplastic resins with two or more thermoplastic elastomers. The polymers used are commercially available, e.g. PVOH and EVOH from Kuraray (EVAL) or Nippon Goshei. Suitable PAs are available e.g. from BASF, DSM, EMS-Grivory, Arkema, Evonik, Dupont, Suzhou Hipro Polymers and Solvay. POK is available from e.g. Hyosung. PACs are available from e.g. Empower Materials Inc or SK Inc or Novomer.

If an elastomer D is used for polymer B, preferably also when an elastomer C is used for polymer A, the elastomer should be incompatible with the thermoplastic polymer, so non adhering and evenly dispersed without severe touching of the elastomer domains with each other within the matrix. Preferably, the size of the domains (which is the dispersed phase looking like spherical or elliptical particles, but are in fact a coagulated bunch of elastomeric chains) should be less than 400 nm, which is below the wavelength of visible light to ensure good transparency. The elastomers C, D are forming the dispersed phase in this invention.

Suitable thermoplastic elastomers C and D for blending with polymer A and B are e.g. renewably sourced elastomers like polytrimethyl carbonate, poly(lactate/butandiol/sebacate/itaconate) with at least 40 mol-% lactic acid, the triblock elastomer poly(L-lactide)-b-polymyrcene-b-poly(L-lactide), a polyester elastomer like Hytrel RS (Dupont) or poly(3-hydroxybutyrate-co-4-hydroxybutyrate or co-b-hydroxyvalerate) (C.J Cheil Jedang Corp, former Metabolix Inc.), a triblock copolymer from polyitaconate and polyitaconic amide, vanillin methacrylate or glycerol dimethacrylate block copolymers (the latter possesses high thermostability over conventional vinylesters resins where styrene is used and so can act as a suitable bio-based substitute for styrene), poly(glycerol sebacate) (PGS, also called biorubber), polytetramethylene ether glycol, and blends thereof. Typically if used the amount of elastomer C and D ranges from 3 to 45 wt.-%, preferably from 5 to 25 wt.-%, with respect to the total weight of polymer blend AC and BD. If polymer A is PA then elastomer C is preferably incompatible. The thermoplastic polymer B and elastomer D are essentially incompatible, that means they form separate phases which essentially do hardly mix on molecular level. In general they form a continuous phase and a dispersed phase in the form of spherical or elliptical somewhat stretched or not coagulated elastomeric chains.

Thermoplastic polymers blended with elastomer as described exhibit ductile behaviour instead of brittle behaviour. This can be synergistically supported by controlling the size of the crystals through quenching the molten polymer film quickly with cold water in a water quenched blown film process. Further, making the layers thinner than 3 μm results in orienting the polymer blends so that they lose a freedom degree. This cannot be recovered upon reheating of the film until the beginning of its melting trajectory (onset of the melting curve in a DSC measurement, according ISO 11357-3; ISO 3146; ASTM D 3418) of the lowest melting layer. Consequently the chains are trapped in a metastable state, and a film made accordingly is not significantly shrinking and creeping anymore. This is an important property especially for medical packaging. Medical packaging typically needs to be sterilizable, most often by steam or pressurized hot water or EtO (ethylene oxide) at elevated temperatures or pasteurizable at elevated temperatures. The shrink in all cases should not be higher than 10% in all directions preferably less than 5%. Sterilizing temperatures when steam is used or pressurized hot water is 121° C. (250° F.). Retorting temperatures are from 121° C. to 135° C. and EtO and pasteurization is commonly done in the range from 65 to 85° C., as described in the European, United States, Japanese, Chinese Pharmacopoeias and in FDA CFR 21. The thickness of the barrier stack of alternating layers A and B or AC and BD usually ranges from 4 to 60 µm, preferably from 4 to 30 µm.

The laminate structure can and often does include one or more further functional polymer (preferably from renewable sources) layers, e.g. impact strength or stiffness promoting layers or skin layers or a layer with a food approved colorant, or improving printability, or giving soft touch, or adding colour, or improving or enhancing sealing or improving biodegradability or compostability in sea or soil. These further layers can be laminated on either side of the alternating stack. Tie layers can and will be interposed to improve adhesion of adjacent layers where needed. A typical total thickness of the laminate structure with added functional layers ranges from 15 to 400 µm, preferably from 25 to 250 µm. Typically, but not limiting, the skin layers meant for sealing and printing have a thickness ranging from 5 to 35% of the total film thickness.

One preferred skin layer is for example a layer which is good sealable. Useful materials are homopolymers of bio-ethylene e.g. low density polyethylene (LDPE), medium density polyethylene (MDPE), high density polyethylene (HDPE), and more preferred copolymers from bio-ethylene and 1-alkenes e.g. propene, 1-butene, 1-pentene, 1-hexene, 1-heptene, 1-octene, so called alpha olefins, or copolymers of bio-ethylene with vinylacetate, methyl- or ethyl- or butyl-acrylate, or acrylic based ionomers (ION), or copolymers of bio-ethylene with a low amount of cyclic olefins like norbornene or blends and mixtures thereof. The materials can include a bio-elastomer, preferably in an amount of less than 30 wt.-%. The laminate structure with such a skin layer can be sealed by heat, by impulse heating, by induction and by ultrasonic or high frequency, the latter only in the case of polar (asymmetric) polymers. Sealing of this functional layer can be done to itself or to another film skin layer of this type or to a non-woven (fabric) or (coated) paper or Tyvek®.

A further preferred skin layer is added to provide printability. Most bio-polymers are polar or somewhat polar and are good printable. Also bio-polyolefins with a minor amount of a grafted polyolefin or ester can enhance printability. The thickness of an extrudable skin layer is generally in the range from 5 to 30 µm. The skin layer can also be a thin coating (a few µm or less) like for instance an acrylate based coating for instance even with nanoclay particles in it. The laminate structure with such a skin layer has good printability using one or more of the different printing techniques commonly used (e.g. Flexo, Gravure, Offset).

Often, two skin layers are added, one skin layer to allow sealing and another one to allow printing on the opposite side of the barrier stack. These skin layers can also be chosen such that one (or both of them) provides printability and sealability. Appropriate materials are known in the art.

In one embodiment, an impact strength promoting layer is included that improves puncture resistance of the laminate structure. A preferred impact strength promoting layer can be made from polyesters, polyesteramides and polyurethanes generated (partly) from lignin or vinyl esters out of vanillin. Typically but not limiting such a layer can range in thickness from 10% to 70% of the total film thickness.

In one embodiment a stiffness promoting layer is included to increase stiffness of the laminate structure. A preferred stiffness promoting layer can be made from e.g. bio-based polyesters, furanoates, e.g. polyethylene furanoate (Avantium), polyamide (PA) or other stiff but preferably tough polymers. Normally a stiffness promoting layer is not very thick most often but not limiting in the range of 2 to 15% of the total film thickness.

So the skin layers are made from bio-based polymers like polybutylene succinate (PBS) (properties like LDPE), poly (ethylene (or propylene or butylene)-2,5-furandicarboxylate) (PEF; PPF, PBF) with properties comparable to poly (ethylene terephthalate) (PET), polydihydroxyferalic acid (PHFA) with also properties comparable to PET, poly(ethylene-2,5-furandicarboxylate-co-ethylene-succinate) (PEFS) available from e.g. Canon, Avatium, Mitsubishi, Showa Denko. Skin layers can be also made from bio-based polymers like poly(hexa (or octa or deca or dodeca) methylene-furandicarboxyamide) marketed by e.g. Dupont, poly (butylene succinate-co-butylene azelate, poly(butylene-succinate-co-terephthalate) (PBST), poly(butylene-adipate-co-terephthalate (PBAT) marketed by e.g. BASF, poly(butylene succinate-co-1,4 butanediamide) or poly(5-hydroxylevalinic acid) available from e.g. Solvay and Borregaard or poly(3-hydroxybutyrate-co-3-hydroxyhexanoate) (P3HB-co-3HH) available from e.g. Kaneka. Further of interest are polymers based on lactic acid like polylactic acid-co-glycerolmonostearate and polylactic acid-co-glycololic acid (PLGA). A polymer with similar properties to polybutylene terephthalate is bio-poly(trimethylene terephthalate) marketed by e.g. Dupont with tradename Sorona EP. Also of interest is poly-p-dioxanone marketed by e.g. Evonik. Further of interest are polyurethanes elastomers based on isosorbide and polycarbonate diol or polyetherimides like PEBAX marketed by e.g. Arkema or poly(oligotetramethylene succinate-co-tetramethylene carbonate) (PTMS/PTeMC) marketed by e.g. Mitsubishi or PBS with hydroxyl end groups reacted with 4,4 methylene diphenyl diisocyanate (MDI) to form a bio-based polyesterurethane. Also blends can be made from these (partly) bio-based polymers to accomplish the objectives for skin layers.

Tie layers are added to improve adhesion of the barrier layer stack with functional layers and/or between functional layers as needed. Useful materials for tie layers are e.g. maleic anhydride grafted bio-polyolefin (MAH-g-PO) or polyolefin copolymer (MAH-g-coPO), or benzoxazine resins, polyurethanes, glycolpolymers, polyesters made (partly) from renewable sources. These serve to adhere e.g. a PA or PA blend layer to a skin layer from bio-PO or other biopolymer. In general extrudable tie layers are used having a thickness in the range but not limited from 2 to about 20 µm.

All the polymers may contain additives, for example antioxidants (like Irganox 1010, 1076), antiblocking agents (like $SiO_2$, erucamide, ethylenebis stearate), acid scavengers (like hydrotalcite, MgO), which are used in their usual amounts. For food packaging only additives which are food approved (in USA, by FDA and in Europe at least) for direct or indirect food contact, preferably for direct food contact, are used for the skin layers. If used for medical applications preferably the additives are mentioned in the European pharmacopoeia edition 9 chapter 3. In the layers a colorant may be used for certain applications like a skin colour for ostomy film. The colorants used are food approved.

Also in one of the layers directing to the food or fluid or ingredient contact side, positioned between stack layer and inner skin layer an organic or inorganic oxygen scavenger material may or can be added, like for instance finely dispersed iron powder.

The laminate structure according to the invention can be made in a manner known per se. Preferably a blown film extrusion process is used, wherein the different polymer resins are separately molten in one or more extruders and pumped as individual melt streams into an extrusion die which then shapes the individual melt streams into the multi-layer film. Preferably the resins for the all layers A or AC are molten together and also for all layers B or BD. To make thin alternating layers special annular die designs as described e.g. in U.S. Pat. No. 6,413,595 B1 and U.S. Pat. No. 5,076,776 A are useful. The blow-up ratio is typically 1:2 at least, preferably 1:3 or more, the bubble is cooled by water quenching. Subsequently the extruded laminate with the polymer resin layers, now the laminate structure, will be wound on a roll in a winder.

The invention shall be illustrated with the following figures, without being restricted to the specific embodiments described. The invention includes all combinations of described and especially of preferred features that do not exclude each other.

A characterization as "approximately", "around" and similar expression in relation to a numerical value means that up to 10% higher and lower values are included, preferably up to 5% higher and lower values, and in any case at least up to 1 higher and lower values, the exact value being the most preferred value or limit. If not otherwise specified any amount in % or parts is by weight and in the case of doubt referring to the total weight of the composition/mixture concerned. The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

Figure 1:
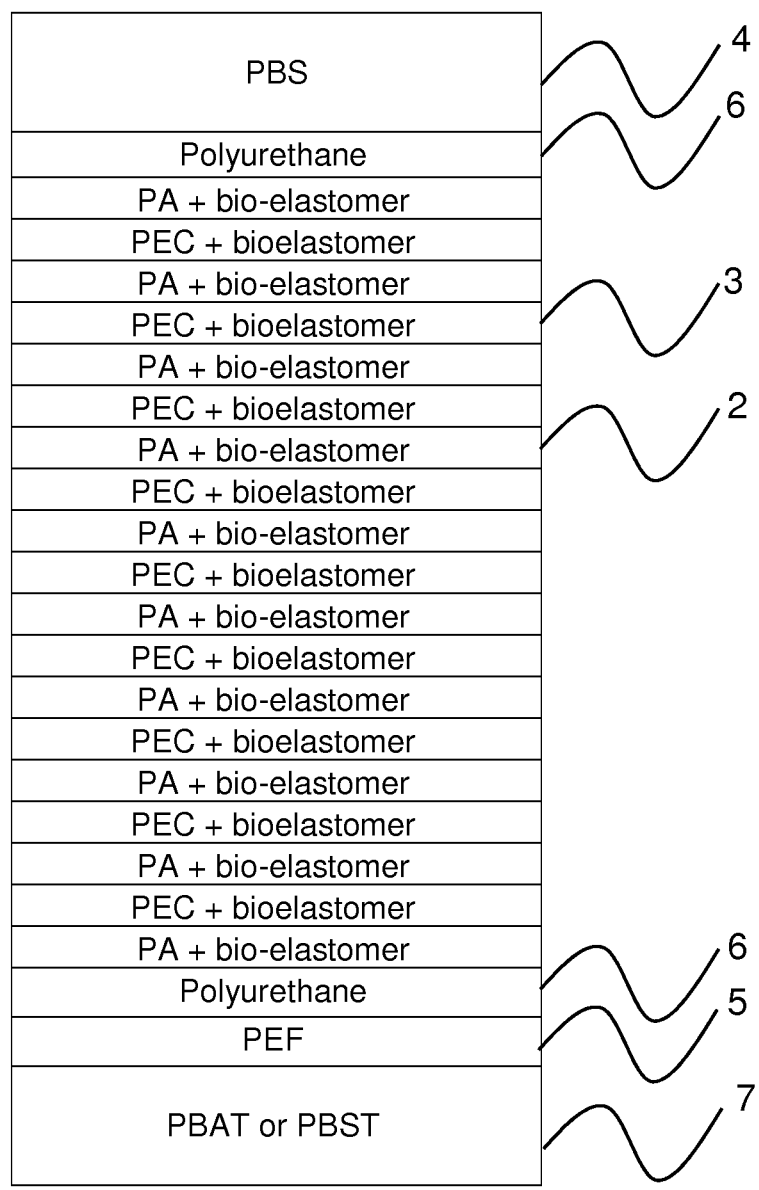
FIG. 1 shows a laminate structure according to the invention

FIG. 1 shows a section through a laminate structure 1 produced by an extrusion line. In this example, the laminate structure 1 comprises an alternating stack of twenty-four sequential layers made from ten polymer layers 2 (polymer blend AC: bio-Polyamide+bio-elastomer) and nine polymer layers 3 (polymer blend BD: PEC+bio-elastomer). The alternating stack has an -AC-[BD-AC-]$_n$ layer sequence with n=9. The structure 1 also comprises further functional layers: a skin layer 4 of, for example, PBS forming the laminate structure sealing layer, an impact strength promoting layer 5 of, for example, polyethylene furanoate (PEF); an adhesion-promoting layer 6 of, for example, polyurethane tie resin promoting adhesion of the sealing skin layer 4 and the impact strength promoting layer 5 with the respective adjacent AC layers 2; and a skin layer 7 made of e.g. PBAT/PBST for printability.

Figure 2:
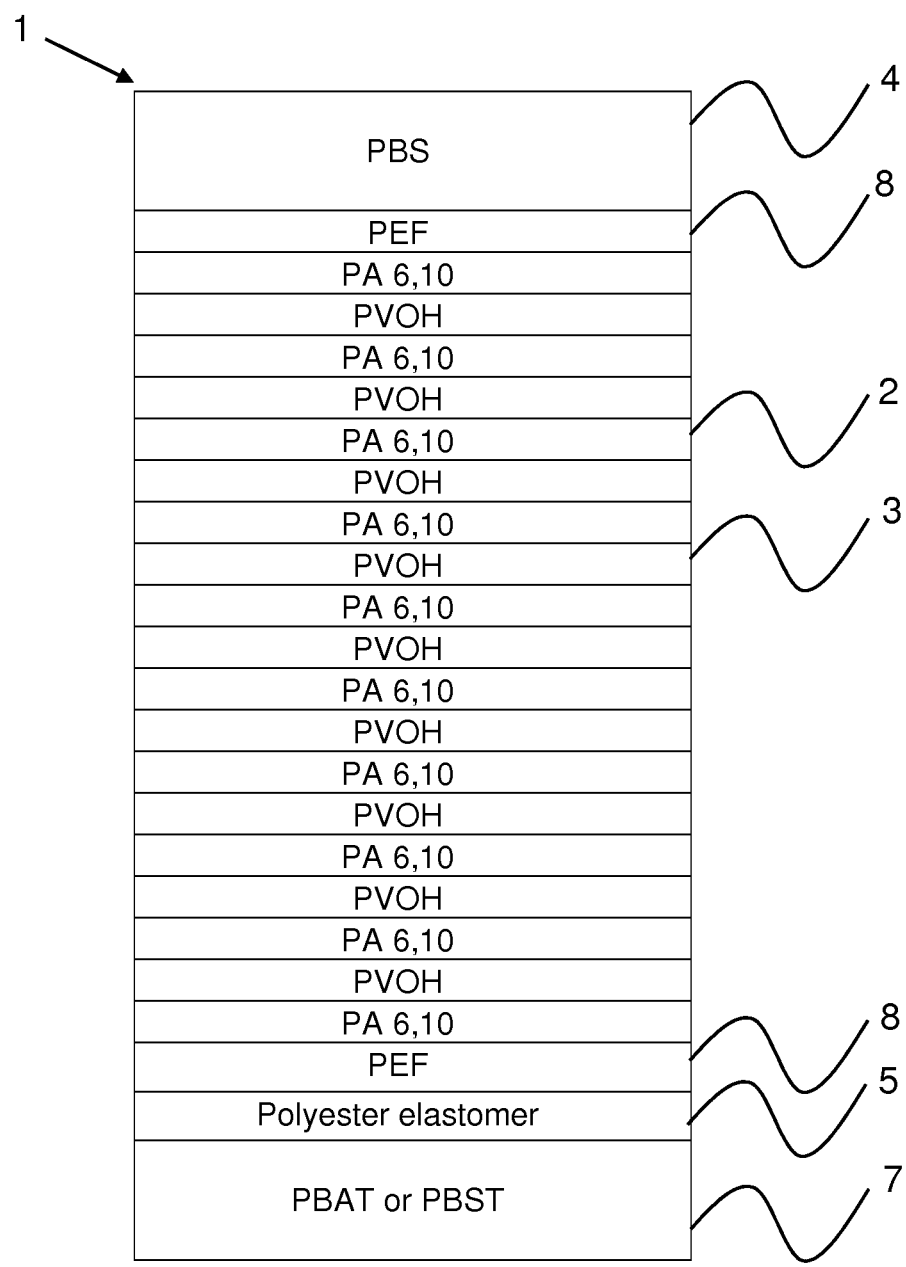
FIG. 2 shows a second laminate structure according to the invention

FIG. 2 shows a section through an alternative laminate structure 1. In this example, the laminate structure 1 comprises a skin layer 4 forming the laminate structure sealing layer of, for example, PBS, an alternating stack of twenty-four sequential layers made from ten polymer layers 2 (polymer A: PA 6,10) and nine polymer layers 3 (polymer B: PVOH). The alternating stack has an -A-[-B-A-]$_n$ layer sequence with n=9. The structure 1 also comprises further functional layers: an impact strength promoting layer 5 of, for example, polyester elastomer a laminate stiffness promoting layer 8 of, for example, polyethylene furanoate (PEF); and a skin layer 7 made of PBAT or PBST polymer to enhance printability.

In the laminate structures shown in FIGS. 1 and 2 the polymer resin stack sequence typically has a thickness of from around 4 to around 60 µm while the laminate structure 1 has an overall thickness in the range from 15 µm to 400 µm. The individual layers of polymer A and B or polymer blends AC and BD comprised in the stack sequence typically each have a thickness of less than 1 µm.

The laminate structures as described in FIGS. 1 and 2 form very effective packaging laminate materials with a highly flex-crack resistant aroma and gas barrier and are suitable for use in medical, food and other packaging applications like bag-in-box liners for use in modern food and liquid food packaging systems, ostomy films, (total) parenteral, enteral, topical, cell culture and storage films and bags, lidding films. They can for example be used on thermoforming machines and in vacuum skin packaging machines. The extruded laminate as described in this invention can, if desired, also be printed at least with an appropriate skin layer included. The flexible laminates are thus preferably used as packaging film with gas, aroma and moisture barrier functions, flexibility, transparency and toughness for medical, food and other substances or items. They are useful as ostomy film; for packaging of (liquid) (total) parenteral, enteral, intravenous (IV), continuous ambulatory peritoneal dialysis (CAPD), and topical medication (e.g. drugs, nutrition); for making cell culture and storage (2D, 3D) single and multi compartment (e.g. multichamber) bags and containers; and for use in food packaging applications like bag-in-box liners and lidding films; and for packaging of cosmetics and personal hygiene articles.

EXAMPLE

A laminate structure approximately 80 µm thick according to the invention was made as shown in FIG. 1, each layer being about 0.9 µm thick, and on both sides of the AC, BD stack a tie layer of approximately 3 µm was extruded. A sealed bag was made from this laminate structure and as comparison a bag from a laminate LLDPE/tie/PA/EVOH/PA/tie/EVA. Chopped onions were placed inside the bags and the bags sealed and stored at RT. After a few days the onions in the comparison bag became brown and an onion smell was perceivable. In the bag made from the laminate structure according to the invention the onions remained white for months and no smell was detected. This shows that the novel biocompatible structure provides a very effective barrier.

Thus, the present invention provides biocompatible laminate structure comprising an alternating stack of layers from polymers A and B or polymer blends AC and BD having the sequence -A-[B-A-]$_n$- or AC-[BD-AC-]$_n$ with n from 4 to 36, wherein the layer thickness of layers A or AC and layers B or BD is less than 3 µm, wherein A and B are thermoplastic polymers and C and D are thermoplastic elastomers, at least part of the monomeric building blocks of polymer A, B or A and B are from renewable sources wherein the thermoplastic polymer B has functional barrier properties, wherein the amount of the thermoplastic elastomers C and D in the polymer blends AC and BD is each from 3 to 45 wt.-%, and polymer B and elastomer D are essentially incompatible.

The invention claimed is:

1. A flexible laminate structure comprising
an alternating stack of layers of different types of polymer A and polymer B having the sequence -A-[B-A-]$_n$ with n from 4 to 36, wherein a layer thickness of each of the layers A and B is less than 3 µm, wherein A and B are thermoplastic polymers based at least partly on renewable sources,
wherein the thermoplastic polymer A is selected from the group consisting of
a polyamide, a nucleated polyamide, a blend of a polyamide with an ethylene vinyl alcohol copolymer, a poly(alkylene carbonate), a poly(alkylene succinate), a polyketone, an ionomer, a copolymer of an bio-olefin with a carboxylic acid, a copolymer of an bio-olefin with a carboxylic acid ester, an ionomer of a copolymer of an bio-olefin with a carboxylic acid, or a mixture of a copolymer of an bio-olefin with a carboxylic acid with a copolymer of an bio-olefin with a carboxylic acid ester, a mixture of a copolymer of an bio-olefin with a carboxylic acid with an ionomer of a copolymer of an bio-olefin with a carboxylic acid, a mixture of a copolymer of an bio-olefin with a carboxylic acid ester with an ionomer of a copolymer of an bio-olefin with a carboxylic acid, a mixture of a copolymer of an bio-olefin with a carboxylic acid and a copolymer of an bio-olefin with a carboxylic acid ester and an ionomer of a copolymer of an bio-olefin with a carboxylic acid, a maleic anhydride grafted polyolefin, a maleic anhydride grafted bio-olefin carboxylic acid copolymer, a maleic anhydride grafted bio-olefin carboxylic acid ester copolymer, a maleic anhydride grafted bio-olefin carboxylic acid ionomer, a blend of (i) a maleic anhydride grafted bio-polyolefin with (ii) a non-grafted bio-polyolefin, bio-olefin carboxylic acid copolymer, bio-olefin carboxylic acid ester copolymer, or bio-olefin carboxylic acid ionomer, a blend of (i) a maleic anhydride grafted bio-olefin carboxylic acid copolymer with (ii) a non-grafted bio-polyolefin, bio-olefin carboxylic acid copolymer, bio-olefin carboxylic acid ester copolymer, or bio-olefin carboxylic acid ionomer, a blend of (i) a maleic anhydride grafted bio-olefin carboxylic acid ester copolymer with (ii) a non-grafted bio-polyolefin, bio-olefin carboxylic acid copolymer, bio-olefin carboxylic acid ester copolymer, or bio-olefin carboxylic acid ionomer, and a blend of (i) a maleic anhydride grafted bio-olefin carboxylic acid ionomer with (ii) a non-grafted bio-polyolefin, bio-olefin carboxylic acid copolymer, bio-olefin carboxylic acid ester copolymer, or bio-olefin carboxylic acid ionomer,
wherein the thermoplastic polymer B is selected from the group consisting of
an ethylene vinyl alcohol copolymer, a polyketone, a polyvinyl alcohol, polyalkylene carbonate, poly(1,3-glycerol carbonate), poly(1,3-glycerol carbonate), poly(1,3-glycerol carbonate) mixed with polytetramethylene succinate, and a mixture of (i) polyamide with (ii) ethylene vinyl alcohol copolymer or polyketone or polyvinyl alcohol copolymer or polyalkylene carbonate,
wherein the thermoplastic polymer B has functional barrier properties against transmission of oxygen, nitrogen, carbon dioxide, organic vapors and moisture,
wherein the flexible laminate structure has a water vapor transmission rate of less than 5 g H$_2$O per m$^2$ in 24 hours at 23° C. and 85 Vol.-% relative humidity (DIN 53122) and an oxygen transmission rate of less than 10 cm$^3$ O$_2$ per m$^2$ in 24 hours at 23° C. and 50 Vol.-% relative humidity (ASTM D 3985),
wherein the flexible laminate structure has an elongation at break >200% measured according to ISO 527-2.3 or ASTM D882 and a tensile modulus from 75-150 MPa measured according to ISO 527-1.2.3 or ASTM D882 at 23° C. and 50% relative humidity,
wherein the flexible laminate structure is obtained by blown film extrusion with water quenching and orientation of polymer chains by controlling blow-up ratio.

2. The flexible laminate structure according to claim 1, wherein one or both of polymers A and B are blended with a thermoplastic elastomer,
wherein, if blended, polymer A is blended with a thermoplastic elastomer C to form a polymer blend AC,
wherein, if blended, polymer B is blended with a thermoplastic elastomer D to form a polymer blend BD,
wherein thermoplastic elastomers C and D are based on at least partially renewable sources,
wherein the amount of the thermoplastic elastomers C and/or D in the polymer blends AC and BD is each from 3 to 45 wt.-%,
wherein polymer B and thermoplastic elastomer D are essentially incompatible, and
wherein the alternating stack of layers has the sequence -AC-[BD-AC-]$_n$, -A-[BD-A-]$_n$, or -AC-[B-AC-]$_n$, with n from 4 to 36, and wherein a layer thickness of each of the layers A or AC, B or BD is less than 3 µm.

3. The flexible laminate structure according to claim 1, wherein polymer A is a polyamide or a nucleated polyamide.

4. The flexible laminate structure according to claim 1, wherein polymer A is selected from the group consisting of a copolymer of (i) bio-ethylene with (ii) a carboxylic acid or ester or ionomer or mixture thereof, and a maleic anhydride grafted copolymer of (i) bio-ethylene with (ii) a carboxylic acid or ester or ionomer or mixture thereof.

5. The flexible laminate structure according to claim 4, wherein one or both of polymers A and B are blended with a thermoplastic elastomer, wherein, if blended, polymer A is blended with a thermoplastic elastomer C to form a polymer blend AC, wherein, if blended, polymer B is blended with a thermoplastic elastomer D to form a polymer blend BD.

6. The flexible laminate structure according to claim 5, wherein the thermoplastic elastomers C and D are independently from each other polytrimethylene carbonate, poly(lactate/butanediol/sebacate/itaconate) with at least 40 mol-% lactic acid, a triblock elastomer poly (L-lactide)-b-polymyrcene-b-poly(L-lactide), a polyester elastomer, a triblock copolymer from polyitaconate and polyitaconic amide, vanillin methacrylate or glycerol dimethacrylate block copolymer, poly(glycerol sebacate), polytetramethylene ether glycol, or blends thereof.

7. The flexible laminate structure according to claim 1, wherein polymer A is a polymer from which at least one of its monomeric building blocks is from a renewable source.

8. The flexible laminate structure according to claim 7, wherein the renewable source is one or more of glycerol, diols, vanillin, ferulic acid, lactic acid, levulinic acid, adipic acid, azelaic acid, succinic acid, 1,4-butanediamide, bio-1,4 butanediol, diacids, hydroxyl acids, furans, esteramides, amides, esters, CO, $CO_2$, bio-alkylenes.

9. The flexible laminate structure according to claim 7, wherein one or both of polymers A and B are blended with a thermoplastic elastomer, wherein, if blended, polymer A is blended with a thermoplastic elastomer C to form a polymer blend AC, wherein, if blended, polymer B is blended with a thermoplastic elastomer D to form a polymer blend BD.

10. The flexible laminate structure according to claim 9, wherein the thermoplastic elastomers C and D are independently from each other polytrimethylene carbonate, poly(lactate/butanediol/sebacate/itaconate) with at least 40 mol-% lactic acid, a triblock elastomer poly(L-lactide)-b-polymyrcene-b-poly(L-lactide), a polyester elastomer, a triblock copolymer from polyitaconate and polyitaconic amide, vanillin methacrylate or glycerol dimethacrylate block copolymer, poly(glycerol sebacate), polytetramethylene ether glycol, or blends thereof.

11. The flexible laminate structure according to claim 1, wherein one or both of polymers A and B are blended with a thermoplastic elastomer, wherein, if blended, polymer A is blended with a thermoplastic elastomer C to form a polymer blend AC, wherein, if blended, polymer B is blended with a thermoplastic elastomer D to form a polymer blend BD, wherein thermoplastic elastomers C and D are based on at least partially renewable sources.

12. The flexible laminate structure according to claim 11, wherein the laminate structure has one or more properties selected from the group consisting of:
a tensile strength at break measured according to ISO 527-1.2.3 or ASTM D882 is >15 MPa but less than 40 MPa,
an elongation at break measured according to ISO 527-2.3 or ASTM D882 is >300-%, but less than 800%,
an Izod impact strength measured according to ASTM D256 at 23° C. notched or ISO 180 (1A) notched results in no break,
a Charpy impact strength measured according to ISO 179 notched results in no break,
a tensile impact strength measured according to ISO 8256 Al notched at 23° C. is above 160 KJ/m$^2$,
a dart impact strength measured according to ASTM D1709 is above 250 g,
a Spencer impact strength measured according to ASTM D3420 is above 30 J/mm,
an Elmendorf tear strength measured according to ISO 6383-2 or ASTM D1922 is above 3 N,
a tensile toughness determined by stress strain testing as described in ASTM D638, ASTM D882 and ISO 527 is >25 MJ/m$^3$, and
a puncture resistance tested using a method similar to ASTM F1306-90 or DIN EN 14477 more than 25 J.

13. The flexible laminate structure according to claim 11, wherein the thermoplastic elastomers C and D are each independently selected from the group consisting of polytrimethylene carbonate, poly(lactate/butanediol/sebacate/itaconate) with at least 40 mol-% lactic acid, a triblock elastomer poly(L-lactide)-b-polymyrcene-b-poly(L-lactide), a polyester elastomer, poly(3-hydroxybutyrate-co-4-hydroxybutyrate), poly(3-hydroxybutyrate-co-b-hydroxyvalerate), a triblock copolymer from polyitaconate and polyitaconic amide, vanillin methacrylate or glycerol dimethacrylate block copolymer, poly(glycerol sebacate), polytetramethylene ether glycol, or blends thereof.

14. The flexible laminate structure according to claim 13, Wherein the polyester elastomer is poly(3-hydroxybutyrate-co-4-hydroxybutyrate) or poly(3-hydroxybutyrate-co-b-hydroxyvalerate) or blends thereof.

15. The flexible laminate structure according to claim 1, wherein polymer A is used in the form of a polymer blend AC with a thermoplastic elastomer C, wherein polymer A is a maleic anhydride grafted polyolefin and elastomer C is an at least partly renewably sourced elastomer.

16. The flexible laminate structure according to claim 15, wherein the thermoplastic elastomer C is polytrimethylene carbonate, poly(lactate/butane-diol/sebacate/itaconate) with at least 40 mol-% lactic acid, a triblock elastomer poly(L-lactide)-b-polymyrcene-b-poly(L-lactide), poly(3-hydroxybutyrate-co-4-hydroxybutyrate), poly(3-hydroxybutyrate-co-b-hydroxyvalerate), a triblock copolymer from polyitaconate and polyitaconic amide, vanillin methacrylate or glycerol dimethacrylate block copolymer, poly(glycerol sebacate), polytetramethylene ether glycol, or blends thereof.

17. The flexible laminate structure according to claim 1, further comprising one or more functional layers on either side of the alternating stack.

18. The flexible laminate structure according to claim 17, wherein one of the functional layers is a sealing layer.

19. The flexible laminate structure according to claim 17, wherein at least one of the functional layers is from a polymer with at least a part of its monomeric building blocks from a renewable source.

20. The flexible laminate structure according to claim 17, wherein the flexible laminate comprises at least two functional layers, wherein one of the functional layers is a tie layer promoting adhesion between the alternating stack and the second functional layer.

21. The flexible laminate structure according to claim 1, wherein the laminate structure has one or more properties selected from the group consisting of:
a tensile strength at break measured according to ISO 527-1.2.3 or ASTM D882 is >15 MPa but less than 40 MPa,
an elongation at break measured according to ISO 527-2.3 or ASTM D882 is >300-%, but less than 800%,
an Izod impact strength measured according to ASTM D256 at 23° C. notched or ISO 180 (1A) notched results in no break,
a Charpy impact strength measured according to ISO 179 notched results in no break,
a tensile impact strength measured according to ISO 8256 Al notched at 23° C. is above 160 KJ/m$^2$,
a dart impact strength measured according to ASTM D1709 is above 250 g,
a Spencer impact strength measured according to ASTM D3420 is above 30 J/mm, an Elmendorf tear strength measured according to ISO 6383-2 or ASTM D1922 is at least about 2 N, a tensile toughness determined by stress strain testing as described in ASTM D638, ASTM D882 and ISO 527 is >15 MJ/m$^3$, and a puncture resistance tested using a method similar to ASTM F1306-90 or DIN EN 14477 is at least 15 J.

22. The flexible laminate structure according to claim 1, wherein the flexible laminate structure contains only additives which are approved for direct and indirect food contact or are mentioned in the European pharmacopoeia edition 9 chapter 3.

23. The flexible laminate structure according to claim 1, wherein the flexible laminate structure contains only additives selected from the group consisting of pentaerythrityl tetrakis[3-(3,5-di-tert.butyl-4-hydroxyphenyl)propionate], octadecyl 3-(3,5-di-tert.butyl-4-hydroxy-phe-nyl)-propionate, 2,2',2'',6,6',6''-hexatert.butyl-4,4',4''-[(2,4,6-tri-methyl-1,3,5-benzene-triyl)trismethylene]]-triphenol, 1,3,5-tris(3,5-di-tert.bu-tyl-4-hydroxy-benzyl)-1h,3h,5h-1,3,5-triazine-2,4,6-trione, 3,9-bis(octa-decyloxy)-2,4,8,10-tetraoxa-3,9-di-phospha-spiro[5.5]undecane, tris(2,4-di-tert.butylphe-nyl)phosphite, bis-[2,4-di-tert.butyl,6-methyl)-phenyl-ethyl phosphite, tetrakis-(2,4-di-tert.butylphenyl)-4,4'-bis-phenylenephosphonite, 2,6-di-tert.-butyl-4-methyl-phenol, cal-cium stearate, calcium myristate, calcium palmitate, zinc stea-rate, zinc myristate, zinc palmitate, stearic acid, glycerol monostearate, n,n'-distearoylethylenediamine n,n'-oleoyl(palmi-toyl)-stearoylethylene-diamine, liquid paraffin, (z)-octadec-9-en-amide, (z)-docos-13-enamide, zinc-oxide, sodium-silico-aluminate, hydrous magnesium silicate, hydrous magnesium aluminate, silicondioxide, sodium benzoate, titaniumdioxide, trisodium phosphate, calciumcarbonate, potassium-hydroxide, and zinc octanoate.

\* \* \* \* \*